2,947,712
EPOXIDE RESIN COMPOSITIONS

William J. Belanger, John E. Masters, and Darrell D. Hicks, Louisville, Ky., assignors to Devoe & Raynolds Company, Inc., a corporation of New York No Drawing. Filed June 11, 1956, Ser. No. 590,787

9 Claims. (Cl. 260—18)

This invention relates to novel resinous compositions. In one of its aspects the invention relates to resin compositions which are derived from epoxide compounds, or polyepoxides. In another of its aspects the invention pertains to methods for the preparation of these novel resins.

A great deal of research has been directed toward the production of epoxide resins since these substances have been found to be valuable compositions for use in the manufacture of varnishes, molding resins, adhesives, films and the like.

It is known that these epoxide resins, obtained as a product of reaction of a dihydric compound, such as a dihydric phenol, and an epihalohydrin, can be converted to thermosetting resins by the use of polybasic carboxylic acid anhydrides. It is known, for example, that hard thermosetting resins are obtained by condensing certain epoxide resins with phthalic acid anhydride. This invention has as an object the provision of modified polybasic acid anhydride cured epoxide resins. The invention also relates to the production of fusible, soluble resins resulting from the modification of the polybasic anhydride-epoxide reaction mixture, the modified reaction mixture being capable on heating of forming an insoluble, infusible cured resin.

Theoretically one mol of a diepoxide would require two mols of a dibasic acid anhydride in order to obtain the maximum degree of cross-linking. However, when a dibasic acid anhydride is caused to react in the ratio of two mols of the dibasic acid anhydride to one mol of epoxide the high degree of cross-linking yields a resin whose utility is limited by its brittleness. Hence, less than a two to one anhydride to diepoxide mol ratio is generally used. A ratio of less than two to one, however, does not result in the highest degree of cure. This invention is based on the discovery that, using glycidyl polyethers, when the reaction mixture is modified by the addition of a third ingredient, two mols of anhydride per mol of epoxide can be used, obtaining a highly cured resin, but without the high degree of brittleness. The modified reaction mixture results in a modified anhydride cured epoxide resin.

In accordance with an embodiment of this invention, the modified resins contemplated are prepared by the use of monohydric alcohols as modifying agents. Included are alcohols which are either primary, secondary or tertiary in character and these may be saturated or unsaturated as well as substituted with various substituents. Examples of representative monohydric alcohols include such alcohols as methyl, ethyl, isopropyl, normal butyl, secondary butyl, tertiary butyl, tertiary amyl, lauryl, dodecyl, cetyl, stearyl, 2-ethyl hexanol, ceryl, melissyl, allyl, linoleyl, linolenyl, crotyl, propargyl, cyclopentyl, cycohexyl, benzyl, phenylethyl furfuryl, etc. Desirable alcohols are aliphatic alcohols of less than twenty carbon atoms, preferably alcohols having from 1 to 18 carbon atoms. The invention also includes mixtures of alcohols. Ether-alcohols and ester-alcohols are also intended, for example, 2-hydroxypropyl phenyl ether, 2-ethoxy ethanol, 2-butoxy ethanol, rosin glycol half esters, fatty acid glycol half esters, diglycerides, the reaction product of one mol of a mono-isocyanate with one mol of a dihydric alcohol, half esters of other dihydric alcohols, etc.

Thus, in one of its aspects this invention provides for the preparation of cured resinous compositions by the reaction of a glycidyl polyether containing more than one epoxide group per molecule and having a weight per epoxide below 1000, a polybasic acid anhydride and a monohydric alcohol. Normally when these three ingredients are reacted, an elevated temperature is employed, for example, a temperature sufficient to dissolve in the glycidyl polyether, the polybasic acid anhydride. In other words, the mixture of a polybasic acid anhydride, a monohydric alcohol and a glycidyl polyether are heated together until a clear melt is obtained, say, around 80° C. The mixture is then cured by further heating to obtain compositions which are hard, tough resins having an extremely broad range of usefulness, for example, in the potting and casting fields.

It is to be understood, however, that it is not necessary to use monohydric alcohol per se so long as the alcohol is incorporated into the final resin. For instance, it is possible to mix the acid anhydride, the monohydric alcohol and the glycidyl polyether, and heat the reaction mixture to form a resin of this invention. It is also contemplated that part of the monohydric alcohol, esterified with the acid, can be used along with additional alcohol and acid anhydride to form resins of this invention. As an example, it is possible to react glycidyl polyether and acid anhydride with a product formed by the reaction of one mol of a dibasic acid anhydride with one mol of monohydric alcohol, that is, the half ester. Summarizing, there are two methods by which resins of this invention can be made. The monohydric alcohol, the acid anhydride and the glycidyl polyether can be combined or the polybasic acid anhydride half ester of the monohydric alcohol can be combined with the acid anhydride and the glycidyl polyether.

The reaction of this invention differs from the known use of esters particularly because in accordance wtih this invention the polybasic acid anhydride is present beyond that required to react with the monohydric alcohol. Therefore, excess polybasic acid anhydride acts as a cross-linking agent. An acid anhydride will not react with the epoxy groups, but preferentially will react with a hydroxyl group. Hence, when the polybasic acid anhydride is present beyond that required to react with the monohydric alcohol, it will react with an alcoholic hydroxyl group, either present in the glycidyl polyether, or formed by the previous reaction of an epoxide group with a carboxyl group. The polybasic acid anhydride, having reacted with a hydroxyl group, now contains a free carboxyl group which itself can react with another epoxy group, thus providing another hydroxyl group which is free to react with additional polybasic acid anhydride.

It has been pointed out that per mol of glycidyl polyether more than one mol of, say, a dibasic acid anhydride can be employed if a monohydric alcohol is used in accordance with this invention. In the case of glycidyl polyether, however, it is perhaps better to use epoxide equivalents. The epoxide equivalent represents the weight of the product per epoxide group. The epoxide equivalent of epoxy compounds is determined by titrating a one gram sample with an excess of pyridine containing pyridine hydrochloride (made by adding 16$cc$ of concentrated hydrochloric acid per liter of pyridine) at the boiling point for 20 minutes and back titrating the excess of pyridine hydrochloride with 0.1 N sodium hydroxide using phenolphthalein as indicator, and considering one HCl as equivalent to one epoxide group. Throughout this description the molecular weight of the glycidyl polyethers is assumed to be two times the weight per epoxide. Molecular weight determinations can, however, be made by a standard boiling point elevation method. In some cases, the molecular weight values correspond to the theoretical values for a straight chain polymer. In other cases, however, a higher molecular weight value is obtained, seemingly indicating a more complex structure.

The quantities of glycidyl polyether, polybasic acid anhydride and monohydric alcohol employed in the practice of this invention are probably best expressed as ratios of glycidyl polyether to polybasic acid anhydride to monohydric alcohol, wherein the glycidyl polyether is expressed in epoxide equivalents, the polybasic acid anhydride in anhydride equivalents and wherein the monohydric alcohol is expressed in mols. Since two epoxide equivalents are approximately equal to one mol of a diepoxide, two equivalents of glycidyl polyether are used in the expressions rather than one equivalent. An anhydride equivalent represents the weight of the acid anhydride, generally in grams, per anhydride group. Thus, by two anhydride equivalents is intended two times the weight per anhydride. It has been found that the three reactants desirably can be reacted in a ratio of two epoxide equivalents of glycidyl polyether to two equivalents of polybasic acid anhydride to 0.01 to 0.8 mol monohydric alcohol. In general, it can be said that the maximum amount of monohydric alcohol is less than that theoretically required to produce a linear polymer. Thus, in the case of a monoanhydride, two epoxide equivalents of glycidyl polyether, two anhydride equivalents of monoanhydride and one mol of monohydric alcohol produces a linear polymer. In accordance with this invention, therefore, less than one mol of monohydric alcohol is used. In the case of dianhydride, a linear polymer is produced by reacting two equivalents of glycidyl polyether with two equivalents of dianhydride and two mols of monohydric alcohol. With these reactants, less than two mols of the monohydric alcohol are used to produce a well cured resin, the maximum in any event being less than two mols of monohydric alcohol. As a practical matter, well cured resins are obtainable using two epoxide equivalents of glycidyl polyether to two equivalents of anhydride to about 0.8 mol monohydric alcohol. Obviously, excellent cures are obtained using lower quantities of dihydric alcohol, but the more monohydric alcohol is employed, the more flexible is the cured resin. For example, a desirable ratio of glycidyl polyether to polybasic acid anhydride to monohydric alcohol is two to two to 0.5, wherein the epoxide and anhydride are expressed in equivalents and the monohydric alcohol is expressed in mols.

As indicated, this invention is applicable to glycidyl polyethers containing more than one epoxide group per molecule and having a weight per epoxide below 1000. Desirable glycidyl polyethers are glycidyl polyethers of polyhydric phenols or polyhydric alcohols. Such glycidyl polyethers are generally produced by the reaction of epichlorhydrin or glycerol dichlorhydrin with dihydric phenols, polyhydric phenols or polyhydric alcohols generally in the presence of a condensing agent, for example, caustic alkali.

The products resulting from the reaction of a polyhydric alcohol or polyhydric phenol with epichlorhydrin or glycerol dichlorhydrin are monomeric and straight chain polymeric products characterized by the presence of at least one terminal epoxide group. Monomeric polyglycidyl polyethers include the glycidyl polyethers of polyhydric phenols obtained by reacting in an alkaline medium a polyhydric phenol with an excess, e.g., 4 to 8 mol excess, of an epihalohydrin. Thus, a polyether which is substantially 2,2-bis(2,3-epoxypropoxyphenyl)propane is obtained by reacting bisphenol, 2,2-bis(4-hydroxyphenyl)propane, with an excess of epichlorhydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxy-benzophenone, bis(4-hydroxyphenyl)ethane, and 1,5-dihydroxynaphthalene. The epihalohydrins can be further exemplified by 3-chloro-1,2-epoxybutane, 3-bromo-1,2-epoxyhexane, 3-chloro-1,2-epoxyoctane and the like.

One class of straight chain polymeric glycidyl polyethers is produced by the reaction of a polyhydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary from about one mol bisphenol to 1.2 mols epichlorhydrin or glycerol dichlorhydrin to about one mol bisphenol to 1.5 mols epichlorhydrin or glycerol dichlorhydrin as set forth in U.S. Patent 2,615,007. In addition, sufficient caustic alkali is employed to combine with the chlorine atoms of the epichlorhydrin or glycerol dichlorhydrin.

Another group of polymeric glycidyl polyethers is produced by the reaction of a dihydric phenol such as bisphenol with epichlorhydrin in the proportions of about two mols of epichlorhydrin to about one mol of bisphenol and with the use of caustic alkali in amounts sufficient to combine with the chlorine of the epichlorhydrin. Such glycidyl polyethers are described in U.S. Patent 2,582,985.

Included are polyepoxypolyhydroxy polyethers obtained by reacting epichlorhydrin or glycerol dichlorhydrin with a mononuclear polyhydric phenol such as resorcinol, hydroquinone, catechol, phloroglucinol, etc., or a polynuclear phenol, such as bisphenol (p,p'-dihydroxydiphenyl dimethyl methane), p-p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers.

Another group of polymeric glycidyl polyethers which can be used in accordance with this invention results from the reaction, generally in alkaline or acid medium, of a polyhydric alcohol or polyhydric phenol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methyl-propyl)ether, the reaction product of pentaerythritol and 1,2-epoxy-4,5-epoxy-pentane, and the reaction product of bisphenol and bis(2,3-epoxy-2-methyl-propyl)ether, the reaction product of resorcinol and bis(2,3-epoxypropyl)-ether, a reaction product using catechol, etc. The process for preparing polyepoxypolyhydroxy polyethers of this group is disclosed in U.S. Patent 2,615,008.

As indicated hereinbefore, polyhydric alcohols can be used in the preparation of glycidyl polyethers as well as polyhydric phenols. As set forth in U.S. Patent 2,581,464, these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol and the like, subsequently treating the resulting product with an alkaline compound.

The polybasic acid anhydrides useful in preparing the resin compositions of this invention contain one or more anhydride groups. Polybasic acid anhydrides applicable to the invention include both aliphatic and aromatic dicarboxylic acid anhydrides, either saturated or unsaturated, for example, succinic, adipic, maleic, tricarballyic, phthalic and pyromellitic anhydrides. Endo-cis-bicyclo-(2,2,1)-5-heptene-2,3-dicarboxylic anhydride (sold under the trademark "Nadic" anhydride) and 1,4,5,6,7,7-hexachlorobicyclo-(2,2,1)-5-heptene-2,3-dicarboxylic anhydride (sold under the trademark "Chlorendic" anhydride) are also desirable. Preferred polybasic acid anhydrides are the anhydrides of dicarboxylic acids, preferably phthalic acid anhydrides. The acid anhydrides which are produced by diene syntheses can also be used, for instance, the acid anhydrides which are derived from eleostearic acid-glyceride and maleic acid anhydride, also those of maleic acid anhydride plus terpinene or limonene or other unsaturated hydrocarbons of the terpene series. Other polybasic acid anhydrides within the contemplation of this invention are anhydrides of glutaric, sebacic, isosuccinic, tetrahydrophthalic, naphthalenedicarboxylic, diglycolic, hemimellitic, and trimellitic acids.

This invention is not limited to the use of a catalyst. However, improved cures are sometimes obtained thereby. Generally speaking, any of the known catalysts which are activators for epoxide-carboxyl reactions can be used to increase the rate of cure of the compositions, for example, organic bases, tertiary amines and quaternary ammonium hydroxides. Basic catalysts are generally used for this purpose, for example, alkali metal or alkaline earth metal hydroxides and organic bases, such as sodium hydroxide, dimethylaminomethyl phenol and benzyl trimethyl ammonium hydroxide. These alkaline compounds are employed in catalytic quantities, say from 0.01 to 5 percent.

This invention can perhaps be best illustrated by means of examples. The examples are, of course, merely illustrative and are not intended to limit the invention.

EXAMPLE 1

Part a

About 536 parts (2.35 mols) of bisphenol and 211 parts (5.17 mols) of sodium hydroxide (10 percent excess) were combined in 1900 parts water and heated to about 23° C. whereupon 436 parts (4.70 mols) of epichlorhydrin were added rapidly. The temperature was increased and remained at about 90° C. to 100° C. for an hour and 40 minutes. The mixture was separated into a two phase system and the aqueous layer drawn off. The resinous layer that remained was washed with hot water and then drained and dried at a temperature of about 140° C. The Durrans' Mercury Method melting point of the resulting product was 50° C. and the weight per epoxide was about 325.

Part b 13.0 grams (0.02 mol) of the glycidyl polyether of Part a of this example, 6.56 grams (0.04 mol) of "Nadic" anhydride and 0.37 gram (0.002 mol) of lauryl alcohol were combined and heated with stirring until a clear melt was obtained. To this homogeneous melt 0.10 gram of dimethylaminomethyl phenol was added as a catalyst. A portion of the catalyzed melt was poured into an aluminum cup. In a closed container whereby no anhydride would be lost through volatilization, the melt was heated at a temperature of 180° C. for about one hour. A well cured, tough, flexible resin was obtained having very good impact resistance and a Rockwell hardness of 107.

EXAMPLE 2

As in Example 1, 13.0 grams (0.02 mol) of the glycidyl polyether of Part a of Example 1, 14.8 grams (0.04 mol) of "Chlorendic" acid anhydride and 1.88 grams (0.016 mol) of 2-butoxy ethanol were combined and heated with stirring until a homogeneous mixture was obtained. When the system was homogeneous, 0.5 percent of the dimethylaminomethyl phenol was added as a catalyst, based on the total combined weights of the reactants. In order to cure the resinous melt, about 25 grams of the homogeneous mixture was transferred to a shallow aluminum cup. The cup was heated at a temperature of 180° C. for one hour in a closed container. A cured resin was thus produced.

EXAMPLE 3

Part a

About 744 parts (3.26 mols) of 2,2-bis(4-hydroxyphenyl)propane and 223 parts (5.57 mols) of sodium hydroxide (20 percent excess) were combined in 1900 parts water and heated to about 29° C. whereupon 423 parts (4.5 mols) of epichlorhydrin were added rapidly. The temperature was increased and remained at about 93° C. for 90 minutes. The mixture was separated into a two phase system and the aqueous layer drawn off. The resinous layer that remained was washed with hot water and then drained and dried at a temperature of 140° C. The Durrans' Mercury Method melting point of the resulting glycidyl polyether was 80° C. and the weight per epoxide was about 586.

Part b 11.72 grams (0.01 mol) of the glycidyl polyether of Part a of this example, 1.96 grams (0.02 mol) of maleic acid anhydride and 1.35 grams (0.005 mol) of stearyl alcohol were combined and heated to approximately 100° C. A portion of the reaction mixture was then poured into an aluminum cup. In a closed container whereby no anhydride would be lost through volatilization, the melt was heated at a temperature of 180° C. for about one hour. A well cured, tough, fairly flexible resin resulted having very good impact resistance and a Rockwell hardness of 101.

EXAMPLE 4

As in Example 3, 11.72 grams (0.01 mol) of the glycidyl polyether of Part a of Example 3, 2.96 grams (0.02 mol) of phthalic acid anhydride and 0.63 gram (0.007 mol) of 2-ethoxy ethanol were combined and heated to a temperature of about 100° C. To cure the resinous melt, the reaction mixture was transferred to a shallow aluminum cup. The cup was heated at a temperature of 180° C. for one hour in a closed container. A well cured, tough resin was thus produced, having very good impact resistance and flexibility and a Rockwell hardness of 106.

EXAMPLE 5

Part a

In a reaction vessel fitted with a stirrer, 4 mols of bis(4-hydroxyphenyl)-2,2-propane (bisphenol) and 5 mols of epichlorhydrin were added to 6.43 mols of sodium hydroxide as a 10 percent aqueous solution. While being stirred, the reaction mixture was gradually heated to about 100° C., during 80 minutes time and was maintained at 100–104° C. for an additional 60 minutes under reflux. The aqueous layer was decanted and the resin washed with boiling water until neutral to litmus whereupon the resin was drained and dehydrated by heating to about 150° C. The resulting glycidyl polyether had a softening point of 100° C. (Durrans' Mercury Method) and a weight per epoxide of 960.

Part b 18 grams (0.01 mol) of the glycidyl polyether of Part a of this example, 1.96 grams (0.02 mol) of maleic acid anhydride and 1.59 grams (0.006 mol) of linolenyl alcohol were combined and heated to approximately 100° C. A portion of the reaction mixture was then poured into an aluminum cup. In a closed container whereby no anhydride would be lost through volatilization, the melt was heated at a temperature of 180° C. for about one hour. A well cured, tough, flexible resin was thus produced having very good impact resistance and a Rockwell hardness of 94.

EXAMPLE 6

Part a

In a flask equipped with a stirrer, condenser and thermometer were placed 330 grams (3 mols) of resorcinol and 2775 grams (30 mols) of epichlorhydrin in 27 grams of water. To this mixture 250 grams of sodium hydroxide flakes were added slowly in two additions. First 165 grams were added and the flask was slowly heated. When the temperature reached 105° C., heat was withdrawn and the mixture was cooled in a water bath. When the temperature of the mixture decreased to 100° C., an additional 85 grams of sodium hydroxide are added, the mixture being continuously cooled because of the exothermic reaction. After the exotherm subsided, the material was distilled to remove the water. The flask was then cooled, 1000 cc. of benzene added and the product filtered to remove the sodium chloride. The excess epichlorhydrin and other volatile matter were removed under vacuum. A pale amber, viscous liquid having a weight per epoxide of 143 was obtained.

Part b 2.86 grams (0.01 mol) of the glycidyl polyether of Part a of this example, 1.64 grams (0.01 mol) of "Nadic" anhydride and 0.98 gram (0.01 mol) of maleic acid anhydride and 0.24 gram (0.004 mol) of isopropanol were combined and heated to approximately 100° C. A portion of the reaction mixture was then poured into an aluminum cup. In a closed container whereby no anhydride would be lost through volatilization, the melt was heated at a temperature of 180° C. for about one hour. A well cured, tough, flexible resin was thus produced having very good impact resistance and a Rockwell hardness of 109.

EXAMPLE 7

Part a

Following Example 6, a glycidyl polyether was prepared using p,p'-dihydroxydiphenyl instead of resorcinol, the molar proportions as well as the procedure being the same as in the preceding example. The resulting glycidyl polyether was a white crystalline solid having a weight per epoxide of 153.

Part b 3.06 grams (0.01 mol) of the glycidyl polyether of Part a of this example, 2.96 grams (0.02 mol) of phthalic acid anhydride and 0.30 gram (0.002 mol) of 2-hydroxypropyl phenyl ether were combined and heated to approximately 100° C. A portion of the reaction mixture was then poured into an aluminum cup. In a closed container whereby no anhydride would be lost through volatilization, the melt was heated at a temperature of 180° C. for about one hour. A well cured, tough resin was obtained, having very good impact resistance, a high degree of flexibility and a Rockwell hardness of 111.

EXAMPLE 8

Part a

About one mol of bisphenol was dissolved in ten mols of epichlorhydrin and one to two percent water added to the resulting mixture. The mixture was then brought to 80° C. and two mols of solid sodium hydroxide added in small portions over a period of about one hour. During the addition, the temperature of the mixture was held at about 90° C. to 110° C. After the sodium hydroxide had been added, the water formed in the reaction and most of the epichlorhydrin was distilled off. The residue was combined with an approximately equal amount of benzene and the mixture filtered to remove the salt. The benzene was then removed to yield a viscous liquid having a weight per epoxide of 185.

Part b

Ten grams (0.027 mol) of the glycidyl polyether of Part a of this example, eight grams (0.054 mol) of phthalic acid anhydride and one gram (0.004 mol) of linoleyl alcohol were combined and heated with stirring until a clear melt was obtained. To this homogeneous melt, 0.5 percent, based on the total combined weights of the reactants of dimethylaminomethyl phenol was added as a catalyst. A portion of the catalyzed melt was poured into an aluminum cup. In a closed container whereby no anhydride would be lost through volatilization the melt was heated at a temperature of 180° C. for about one hour. A well cured, tough, flexible resin was produced having a Rockwell hardness of 104.

The following table shows the effect of increasing the amount of monohydric alcohol in the cured resin, the reactants being the same as in Example 8.

TABLE 8A

| Glycidyl Polyether | | Anhydride | | Monohydric Alcohol | | Degree of Cure | Toughness | Flexibility | Impact Resistance | Rockwell Hardness |
|---|---|---|---|---|---|---|---|---|---|---|
| grams | mols | grams | mols | grams | mols | | | | | |
| 10 | .027 | 8 | .054 | 2 | .008 | Good | Good | Good | Good | 102. |
| 10 | .027 | 8 | .054 | 3 | .011 | do | do | do | do | 94. |
| 10 | .027 | 8 | .054 | 4 | .015 | do | do | do | do | 47. |
| 10 | .027 | 8 | .054 | 5 | .019 | do | do | do | do | Soft. |

EXAMPLE 9

As in Example 1, ten grams (0.027 mol) of the glycidyl polyether of Part a of Example 8, eight grams (0.054 mol) of phthalic acid anhydride and 0.33 gram (0.0045 mol) of butyl alcohol were combined and heated with stirring until a homogeneous mixture was obtained. When the system was homogeneous, 0.5 percent of dimethylaminomethyl phenol was added as a catalyst, based on the total combined weights of the reactants. In order to cure the resinous melt, the homogeneous mixture was transferred to a shallow aluminum cup. The cup was heated at a temperature of 180° C. for one hour in a closed container. A well cured, tough, fairly flexible resin resulted having a Rockwell hardness value of 104.

The following table shows the effect of increasing the amount of monohydric alcohol in the cured resin, the reactants being the same as in Example 9.

TABLE 9A

| Glycidyl Polyether | | Anhydride | | Monohydric Alcohol | | Degree of Cure | Toughness | Flexibility | Impact Resistance | Rockwell Hardness |
|---|---|---|---|---|---|---|---|---|---|---|
| grams | mols | grams | mols | grams | mols | | | | | |
| 10 | .027 | 8 | .054 | 0.66 | .009 | Good | Good | Fair | Good | 108. |
| 10 | .027 | 8 | .054 | 1.00 | .0135 | do | do | do | do | 108. |
| 10 | .027 | 8 | .054 | 1.33 | .018 | do | do | do | Fair | 107. |

EXAMPLE 10

As in Example 1, ten grams (0.027 mol) of the glycidyl polyether of Part a of Example 8, 0.435 gram (0.002 mol) of pyromellitic acid anhydride, 4.85 grams (0.050 mol) of maleic acid anhydride and 0.47 gram (0.004 mol) of 2-butoxy ethanol were combined and heated with stirring until a homogeneous mixture was obtained. When the system was homogeneous, 0.5 percent of dimethylaminomethyl phenol was added as a catalyst, based on the total combined weights of the reactants. In order to cure the resinous melt, the homogeneous mixture was transferred to a shallow aluminum cup. The cup was heated at a temperature of 180° C. for one hour in a closed container. A well cured, tough, flexible resin resulted having a very good impact resistance and a Rockwell hardness of 75.

The following table shows the effect of increasing the amount of monohydric alcohol in the cured resin, the reactants being the same as in Example 10.

TABLE 10A

| Glycidyl Polyether | | Maleic Anhydride | | Pyromellitic Anhydride | | Monohydric Alcohol | | Degree of Cure | Toughness | Flexibility | Impact Resistance | Rockwell Hardness |
| --- | --- | --- | --- | --- | --- | --- | --- | --- | --- | --- | --- | --- |
| grams | mols | grams | mols | grams | mols | grams | mols | | | | | |
| 10 | .027 | 2.60 | .027 | 2.94 | .0135 | 3.18 | .027 | Good | Good | Good | Good | 98. |
| 10 | .027 | 2.16 | .022 | 3.49 | .016 | 3.78 | .032 | ...do | ...do | ...do | ...do | 98. |
| 10 | .027 | 1.18 | .012 | 4.57 | .021 | 4.96 | .042 | ...do | ...do | ...do | ...do | 41. |

EXAMPLE 11

As in Example 1, ten grams (0.027 mol) of the glycidyl polyether of Part a of Example 8, 7.4 grams (0.050 mol) of phthalic acid anhydride, 1.48 grams (0.004 mol) of "Chlorendic" acid anhydride and 0.61 gram (0.004 mol) of 2-hydroxyphenyl phenyl ether were combined and heated with stirring until a homogeneous mixture was obtained. When the system was homogeneous, 0.5 percent of dimethylaminomethyl phenol was added as a catalyst, based on the total combined weights of the reactants. In order to cure the resinous melt, the homogeneous mixture was transferred to a shallow aluminum cup. The cup was heated at a temperature of 180° C. for one hour in a closed container. A well cured, tough, flexible resin resulted having very good impact resistance and a Rockwell hardness value of 104.

The following table shows the effect of increasing the amount of monohydric alcohol in the cured resin, the reactants being the same as in Example 11.

TABLE 11A

| Glycidyl Polyether | | "Chlorendic" Anhydride | | Phthalic Anhydride | | Monohydric Alcohol | | Degree of Cure | Toughness | Flexibility | Impact Resistance | Rockwell Hardness |
| --- | --- | --- | --- | --- | --- | --- | --- | --- | --- | --- | --- | --- |
| grams | mols | grams | mols | grams | mols | grams | mols | | | | | |
| 10 | .027 | 2.97 | .008 | 6.8 | .046 | 1.22 | .008 | Fair | Good | Good | Good | 106. |
| 10 | .027 | 4.09 | .011 | 6.4 | .043 | 1.67 | .011 | ...do | ...do | ...do | ...do | 107. |
| 10 | .027 | 5.58 | .015 | 5.8 | .039 | 2.28 | .015 | ...do | ...do | ...do | ...do | 108. |
| 10 | .027 | 7.18 | .019 | 5.2 | .035 | 2.89 | .019 | ...do | Fair | Fair | Fair | 110. |

EXAMPLE 12

As in Example 1, ten grams (0.027 mol) of the glycidyl polyether of Part a of Example 8, 5.38 grams (0.054 mol) of maleic acid anhydride and 0.52 gram (0.004 mol) of 2-ethyl hexanol were combined and heated with stirring until a clear melt was obtained. To this homogeneous melt, 0.5 percent, based on the total combined weights of the reactants, of dimethylaminomethyl phenol was added as a catalyst. A portion of the catalyzed melt was poured into an aluminum cup. In a closed container whereby no anhydride would be lost through volatilization, the 25 gram portion of the melt was heated at a temperature of 180° C. for about one hour. A well cured, tough, flexible resin was produced having very good impact resistance.

The following table shows the effect of increasing the amount of monohydric alcohol in the cured resin, the reactants being the same as in Example 12.

TABLE 12A

| Glycidyl Polyether | | Anhydride | | Monohydric Alcohol | | Degree of Cure | Toughness | Flexibility | Impact Resistance |
| --- | --- | --- | --- | --- | --- | --- | --- | --- | --- |
| grams | mols | grams | mols | grams | mols | | | | |
| 10 | .027 | 5.38 | .054 | 1.17 | .009 | Good | Good | Good | Good. |
| 10 | .027 | 5.38 | .054 | 1.69 | .013 | ...do | ...do | ...do | Do. |
| 10 | .027 | 5.38 | .054 | 2.28 | .0175 | Fair | ...do | ...do | Do. |
| 10 | .027 | 5.38 | .054 | 2.86 | .022 | ...do | Fair | ...do | Do. |

The above examples illustrate that desirable, well cured resins are prepared using two epoxide equivalents (assumed to be one mol) of glycidyl polyether to two equivalents of anhydride to not more than about 0.8 mol of monohydric alcohol. The examples also show that excellent, well cured resins are obtained by using lower quantities of the low molecular weight monohydric alcohol. The resins of this invention, prepared by the use of a monohydric alcohol, have better flexibility than the same glycidyl polyether cured with phthalic acid anhydride alone. There are also differences in stress-strain properties, impact strength, heat distortion and the like. Chemically the modified resinous compositions of the invention differ from resins which are not modified by the use of an alcohol in that resins of this invention have a hydroxyl content which is equal to the amount of monohydric alcohol hydroxyl added, while unmodified resins do not.

In addition to advantages in properties, the incorporation of low molecular weight monohydric alcohols into anhydride cured epoxide resins has a distinct economic advantage over the unmodified resins. Not only are the monohydric alcohols relatively inexpensive, but when a maximum amount of the monohydric alcohol is used, the amount of anhydride which can be used is also greater than when anhydride alone is employed, so that the percent epoxide resin in the final product is considerably smaller than in the resin not so modified.

The new resins which are products of the process of this invention are particularly advantageous for use in the fields of molding, paints, varnishes, potting and the like, principally for heat hardening plastics, heat hardening varnishes, enamels and other coatings, electrical insulation, and castings. A particularly important advantage of the invention is that the monohydric alcohols function as fluidizing agents. Thus by the addition of the monohydric alcohol, a viscous glycidyl polyether is made more fluid and hence easier to use before curing, for example, during compounding or fabrication stages.

Other uses and embodiments of the invention will occur to those skilled in the art. For example, mixtures of alcohols, anhydrides or glycidyl polyethers can be used. In addition, the resins of this invention can have certain additional materials incorporated with them to alter or improve some property, or to make them more easily molded. Among the materials which can be added are fillers such as finely divided wood flour, cotton flock, mica, and asbestos; coloring materials such as pigments; thinners which will enable the formation of thin coatings for protection of such materials as metal; plasticizers to aid in adapting the resins to different uses or to impart to them somewhat different properties; and small amounts of other materials which may hasten curing. Such embodiments may be made without departing from the spirit and scope of this invention.

What is claimed is:

1. In the process for heat curing glycidyl polyethers of polyhydric compounds selected from the group consisting of polyhydric alcohols and phenols having at least two phenolic hydroxyl groups, said glycidyl polyether containing more than one epoxide group per molecule, and having an epoxide equivalent below 1000, with polycarboxylic acid anhydrides wherein a ratio of two anhydride equivalents to two epoxide equivalents is employed, the improvement which comprises incorporating 0.01 to 0.8 equivalents of a monohydric alcohol in the glycidyl polyether-anhydride mixture prior to effecting the cure, and heating the mixture wherein the anhydride groups react with hydroxyl groups resulting in carboxyl groups which in turn react with epoxide groups of the glycidyl polyether to form a cured composition, considering an epoxide equivalent as the weight in grams of glycidyl polyether per epoxide group, an equivalent of a monohydric alcohol as the weight in grams of one mol of the monohydric alcohol and an anhydride equivalent as the weight of acid anhydride in grams per anhydride group.

2. The process of claim 1 wherein the monohydric alcohol and polycarboxylic acid anhydride are reacted in situ.

3. The process of claim 1 wherein the alcohol is reacted with anhydride in a ratio of not more than one equivalent of alcohol per equivalent of anhydride prior to addition of glycidyl polyether.

4. The process of claim 1 wherein the monohydric alcohol and polycarboxylic acid anhydride are reacted separately in a ratio of not more than one equivalent of alcohol per equivalent of anhydride, the reaction product being subsequently reacted with the glycidyl polyether and anhydride.

5. The process of claim 1 wherein the glycidyl polyether is a diglycidyl ether of 2,2-bis(p-hydroxyphenyl) propane, having an epoxide equivalent of 170 to 250, wherein the polycarboxylic acid anhydride is phthalic acid anhydride, and wherein the monohydric alcohol is an aliphatic alcohol having not more than about 18 carbon atoms and wherein the reactants are employed in a ratio of 2 equivalents of anhydride to 2 epoxide equivalents of glycidyl polyether to 0.1 to 0.6 equivalent of monohydric alcohol.

6. The process of claim 1 wherein the glycidyl polyether is substantially the diglycidyl ether of a dihydric phenol having an epoxide equivalent of 140 to 250, wherein the monohydric alcohol is an aliphatic alcohol of from 4 to 18 carbon atoms and wherein the polycarboxylic acid anhydride is a dicarboxylic acid anhydride.

7. A cross-linked infusible resinous reaction product resulting from the process of claim 1.

8. A cross-linked infusible resinous reaction product resulting from the process of claim 6.

9. A heat-convertible resinous composition of matter particularly adapted for the formation of shaped articles comprising a glycidyl polyether of a polyhydric compound selected from the group consisting of polyhydric alcohols and phenols having at least two phenolic hydroxyl groups, the glycidyl polyether containing more than one epoxide group per molecule and having an epoxide equivalent below 1000, a polycarboxylic acid anhydride and a monohydric alcohol in a ratio of total anhydride to glycidyl polyether to monohydric alcohol of 2 equivalents of anhydride to 2 epoxide equivalents of glycidyl polyether to 0.01 to 0.8 equivalent monohydric alcohol, considering an epoxide equivalent as the weight in grams of glycidyl polyether per epoxide group, an anhydride equivalent as the weight of acid anhydride in grams per anhydride group, and an equivalent monohydric alcohol as the weight in grams of one mol of the alcohol.

References Cited in the file of this patent

UNITED STATES PATENTS

| 2,324,483 | Castan | July 20, 1943 |
| 2,512,997 | Bixler | June 27, 1950 |
| 2,698,308 | Crecclius | Dec. 28, 1954 |
| 2,700,030 | Widmer et al. | Jan. 18, 1955 |

FOREIGN PATENTS

| 262,479 | Switzerland | Oct. 17, 1949 |

OTHER REFERENCES

Epon Surface Coating Resin Bull. SC 50–40 (1950).
Epon Resins—New Film Formers, Paint, Oil and Chem. Rev., pp. 15–18, 48–49, November 8, 1950.
Ind. and Eng. Chem., vol. 48, #1, pp. 86–93 (January 1956).